June 30, 1953 M. F. HEALY 2,643,582
LOADING MECHANISM FOR MORTARS
Filed Nov. 30, 1945 7 Sheets-Sheet 1
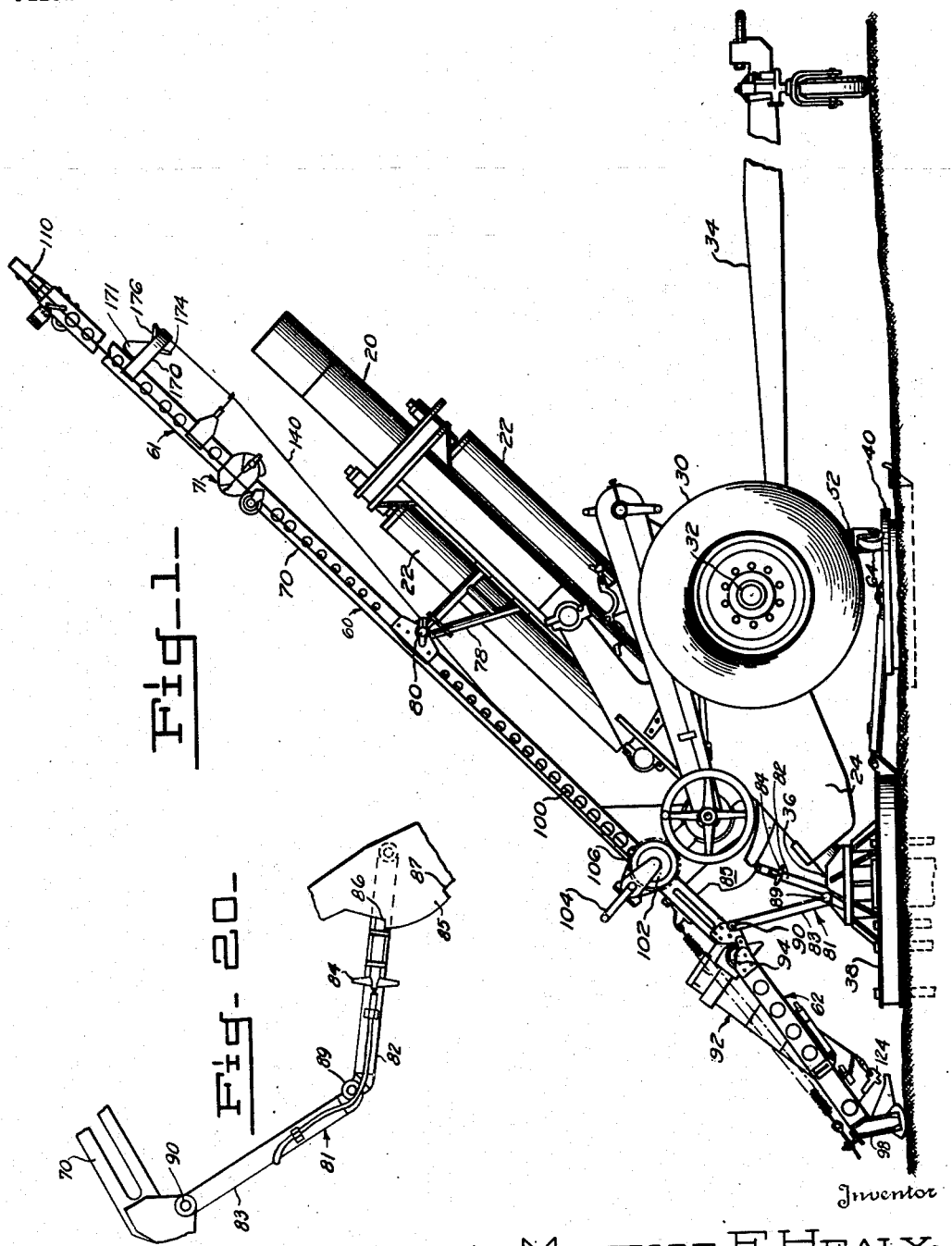

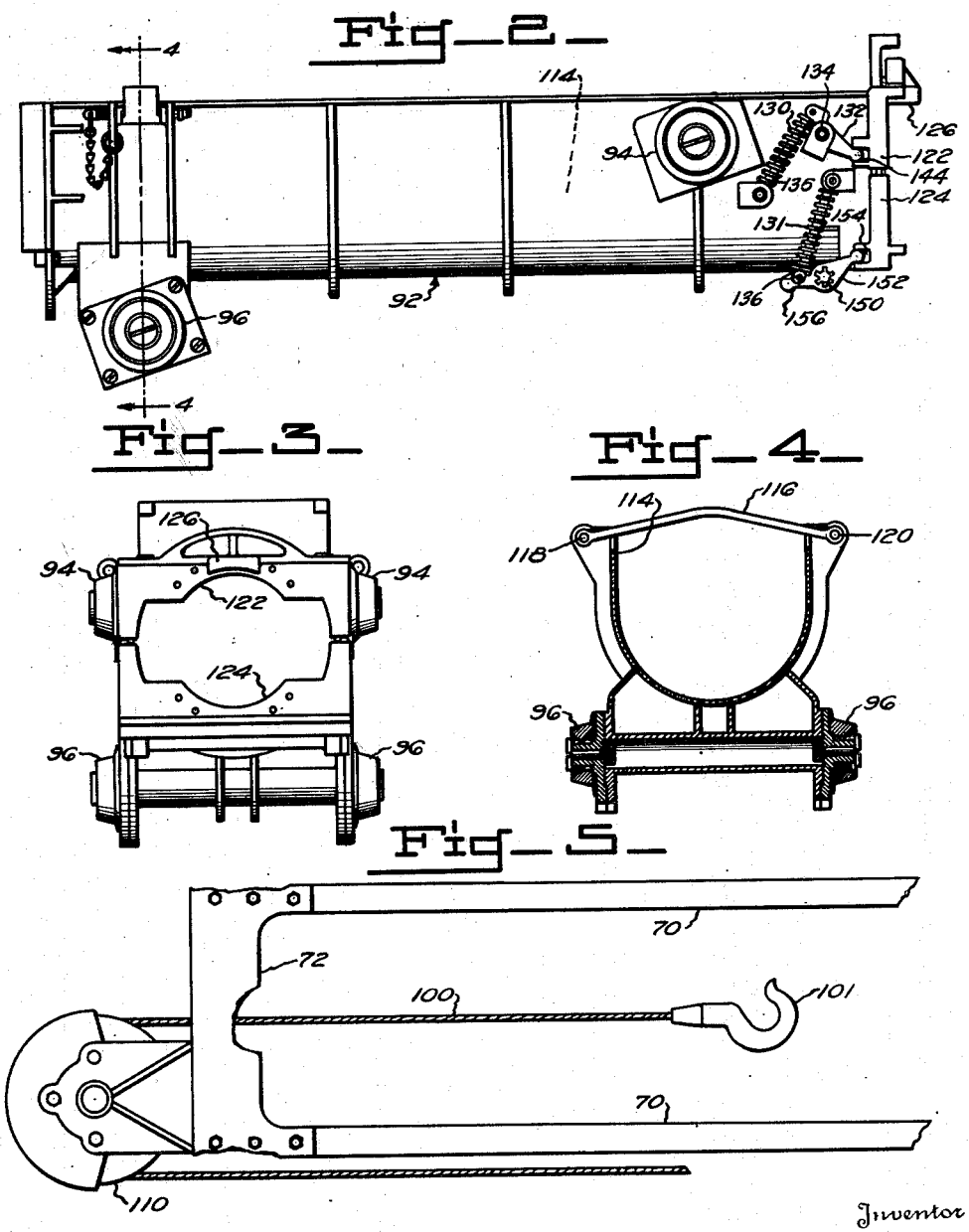

June 30, 1953  M. F. HEALY  2,643,582
LOADING MECHANISM FOR MORTARS
Filed Nov. 30, 1945  7 Sheets-Sheet 3
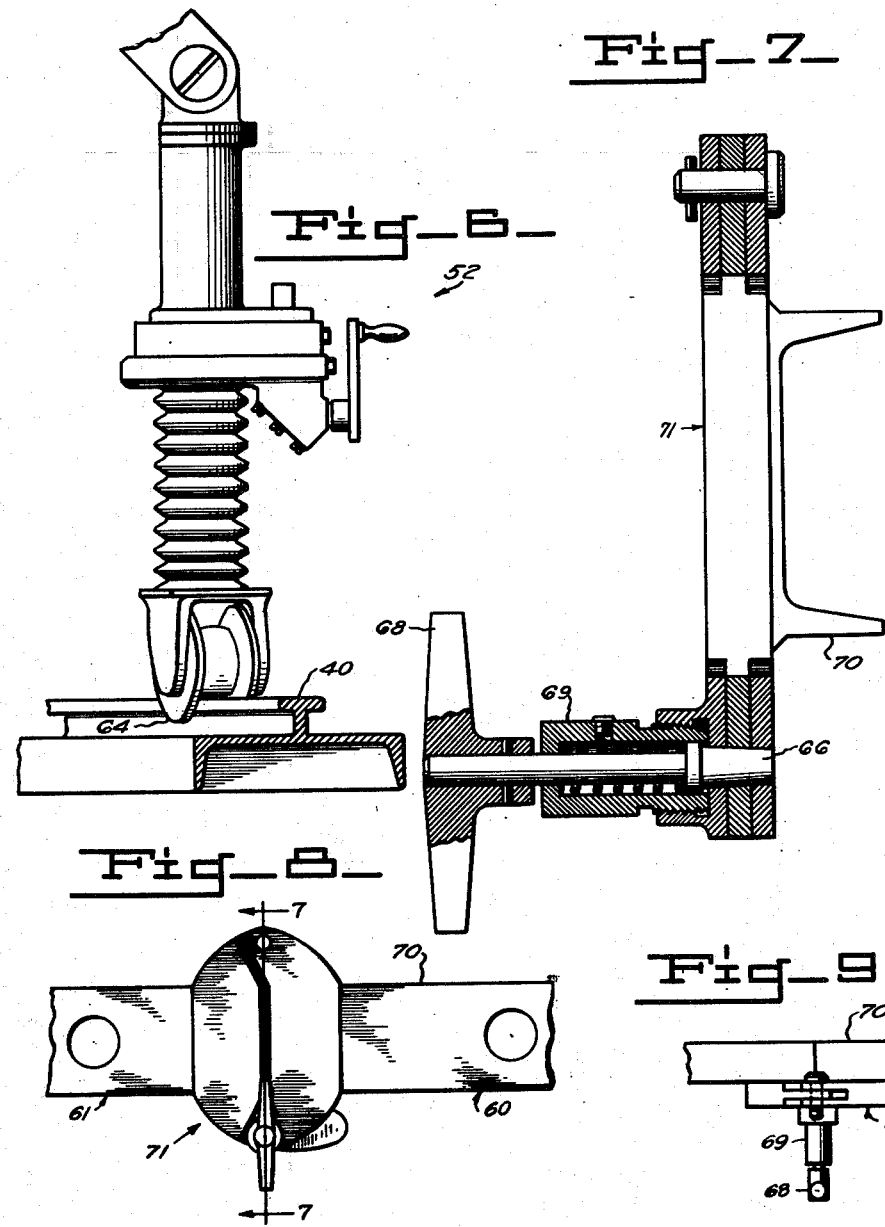

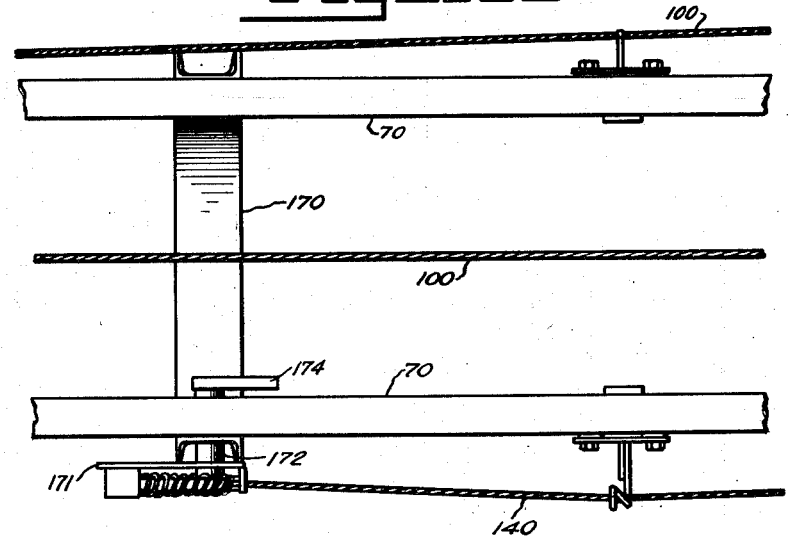
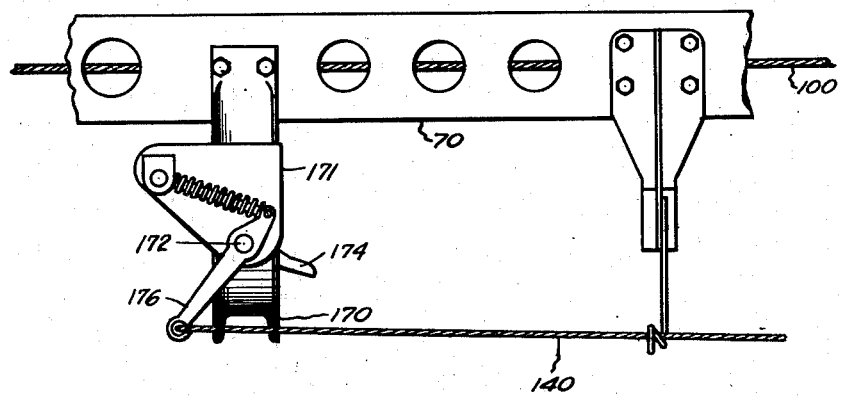

June 30, 1953   M. F. HEALY   2,643,582
LOADING MECHANISM FOR MORTARS
Filed Nov. 30, 1945   7 Sheets-Sheet 5
Fig_12_
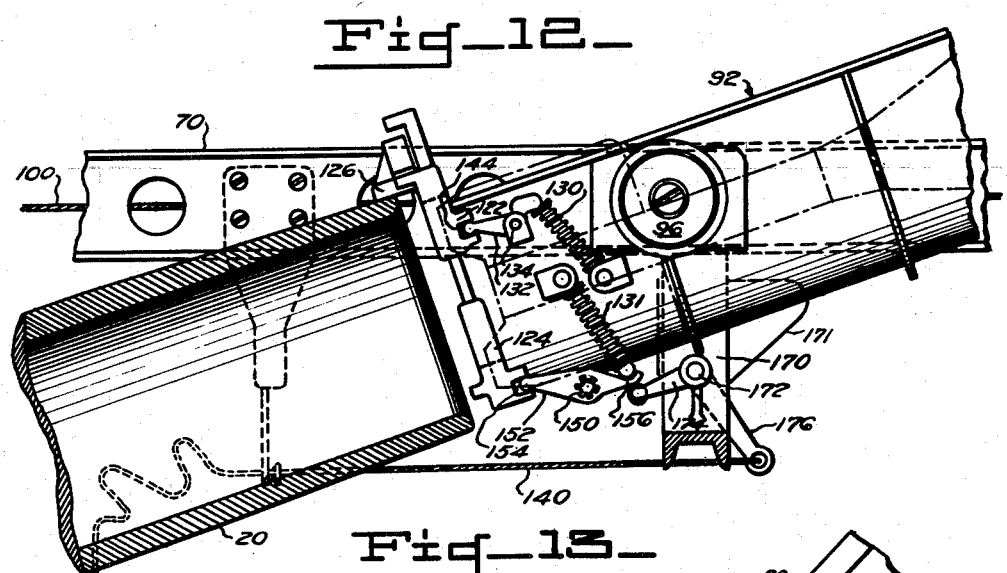
Fig_13_
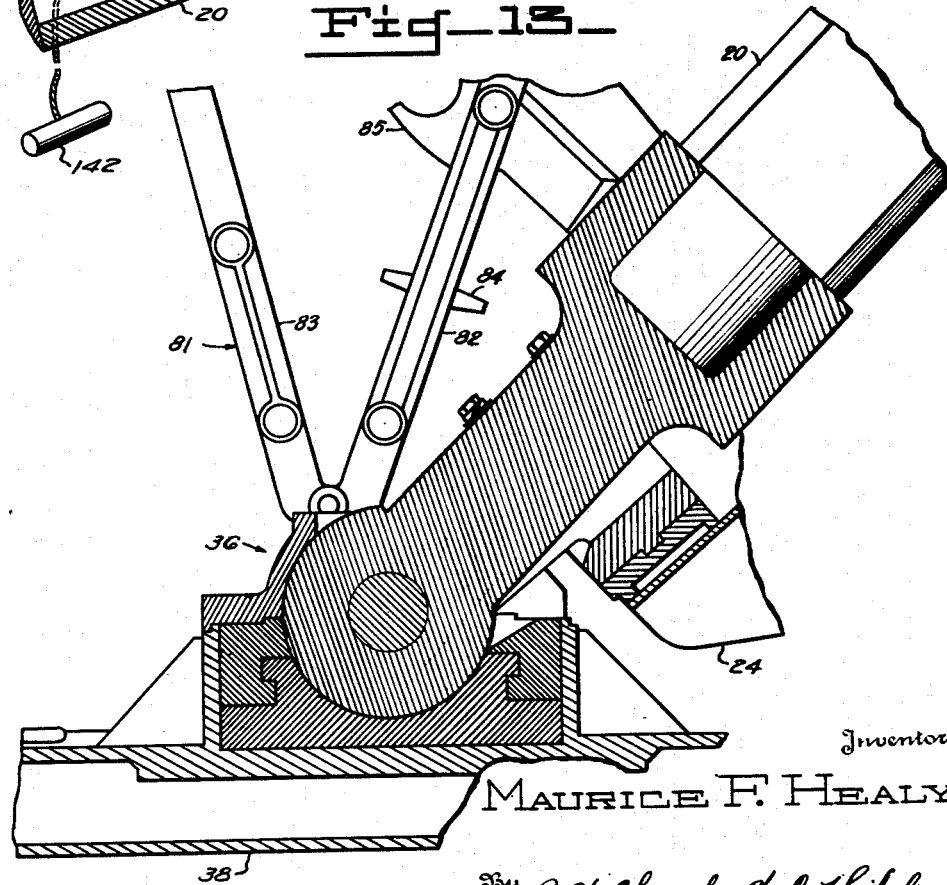
Inventor
MAURICE F. HEALY,
By J. H. Church + W. E. Thibodeau
Attorneys

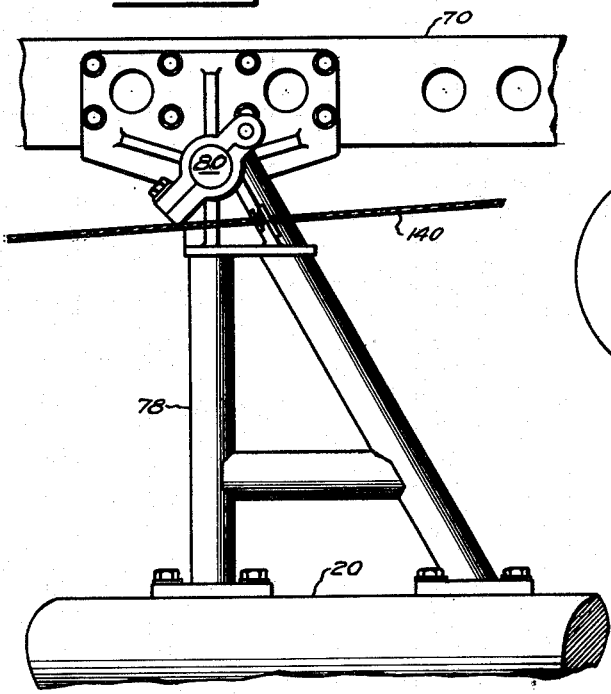
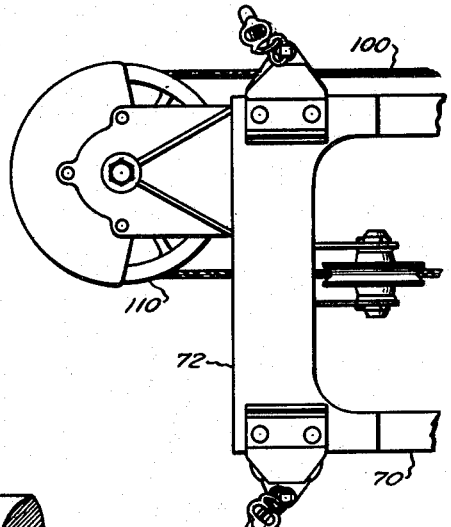
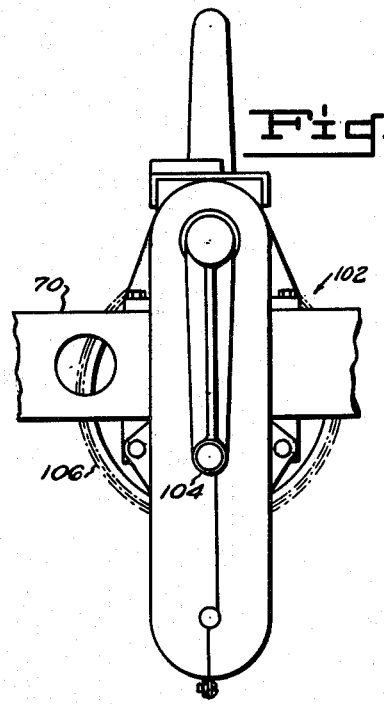
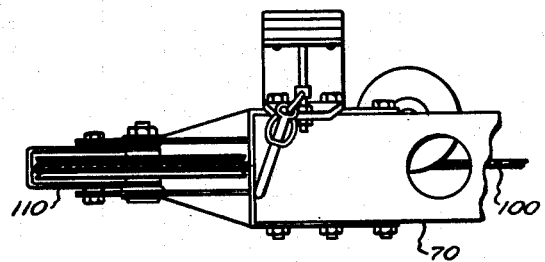

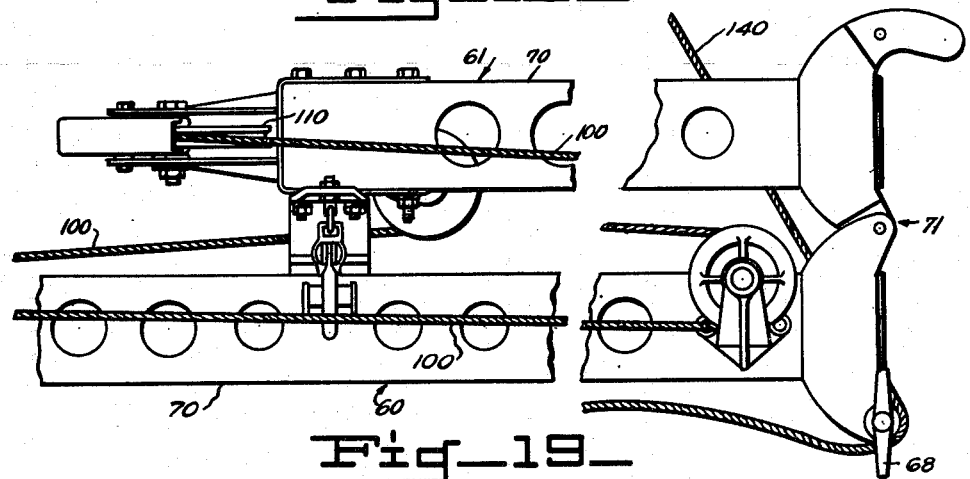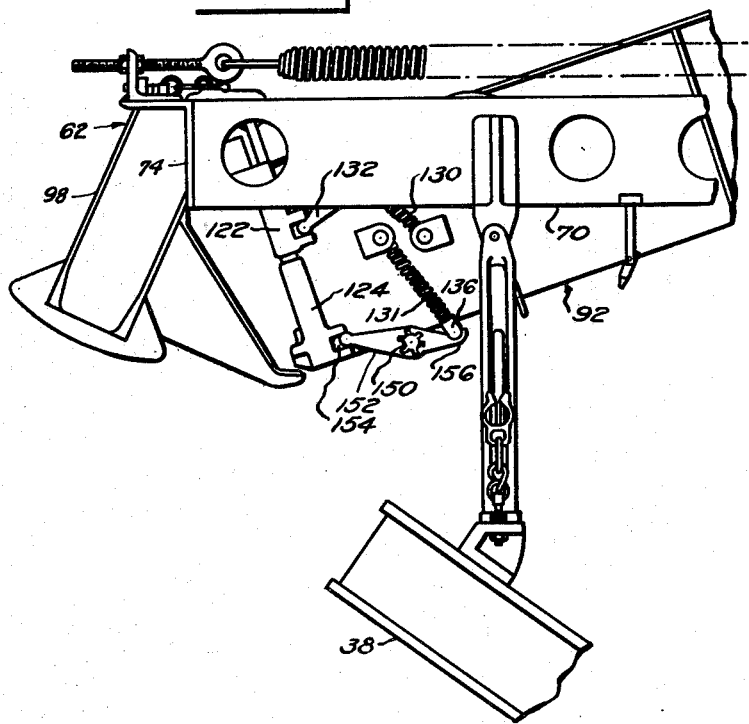

Patented June 30, 1953

2,643,582

UNITED STATES PATENT OFFICE 2,643,582

LOADING MECHANISM FOR MORTARS

Maurice F. Healy, Watertown, Mass., assignor to the United States of America as represented by the Secretary of War Application November 30, 1945, Serial No. 632,096

7 Claims. (Cl. 89—45)

(Granted under Title 35, U. S. Code (1952), sec. 266)

The invention described herein may be manufactured and used by or for the Government for governmental purposes, without the payment to me of any royalty thereon.

In loading mortars of large caliber wherein heavy projectiles are employed, considerable difficulty has been experienced in the loading operation. In some cases it has been necessary to install the mortar in a pit and to depress the muzzle to the edge of the pit so that a projectile can be inserted therein. Such procedure introduces delay in depressing and elevating the barrel of the mortar between shots. Furthermore, in the case of mobile mortars which are designed to be transported rapidly from one position to another, the digging of pits is impractical and time consuming.

An object of the present invention is to provide a simple, effective hoisting apparatus by which heavy projectiles can be readily loaded into the muzzle of a large caliber mortar without disturbing the setting of the mortar. This avoids the necessity of depressing and re-elevating the mortar between successive shots and thus increases materially the speed of fire.

The specific nature of the invention as well as other objects and advantages thereof will clearly appear from a description of a preferred embodiment as shown in the accompanying drawings in which:

Fig. 1 is a right side elevation of the complete mortar assembly including the elevating mechanism.

Fig. 2 is a left side elevation of the car.

Fig. 3 is a rear elevation of the car.

Fig. 4 is a transverse elevation through the rear rollers along plane 4—4 in Fig. 2.

Fig. 5 is a cut-away top view of the forward end of the forward track extension, showing pulley and cable assembly.

Fig. 6 is an elevational view of the screw jack and roller assembly on the arcuate rail.

Fig. 7 is a transverse section through the hinge along plane 7—7 in Fig. 8 showing the latching mechanism.

Fig. 8 is a left side view of the hinge showing its relation to the rails.

Fig. 9 is a top view of the same structure shown in Fig. 8.

Fig. 10 is a top view of a portion of the forward track extension showing the yoke and the attached door releasing mechanism.

Fig. 11 is a left side elevation of the same structure shown in Fig. 10.

Fig. 12 is a right side elevation of the track and car in loading position in front of the mortar tube.

Fig. 13 is a longitudinal vertical section through the supporting ball and socket joint showing the relation of the elbow support thereto.

Fig. 14 is a left side elevation of the support bracket and pivotal mounting of the track.

Fig. 15 is a top view of the forward end of the forward track assembly showing the pulleys and the cable.

Fig. 16 is a right side elevation of the hoisting mechanism.

Fig. 17 is a left side elevation of the structure shown in Fig. 15.

Fig. 18 is a right side elevation of the forward portion of the track and track extension assembly with the track extension in retracted position.

Fig. 19 is a right side view of the rearward track extension with the hoisting car, the track being secured to the mortar base for transportation of the mortar.

Fig. 20 is a right side elevational view of the elbow support and arcuate plate when the track assembly is in the tilted position.

The drawings illustrate a mortar of large caliber comprising essentially a tube or barrel 20 and a recoil mechanism generally indicated at 22 mounted on a carriage 24. The carriage is supported for transportation by a pair of rubber-tired wheels 30 mounted on an axle 32 to which is connected a trail 34.

The mortar tube 20 is mounted on the recoil mechanism 22 which in turn is connected through a ball and socket joint 36 to a base plate 38, the latter being designed to rest on the ground and take the reaction shock of the recoil.

A pair of screw jacks 52 have flanged wheels 64 at their lower ends, the wheels resting on an arcuate track 40. These jacks are provided for elevating the mortar and its carriage sufficiently to lift the wheels 30 clear of the arcuate track so as to permit adjustment of the mortar in azimuth. Suitable means (not shown) is also provided for elevating the mortar tube. The combination of the screw jack and arcuate track comprises no part of this specification and is fully described and claimed in the co-pending application Serial No. 675,123 of Dudley M. Lontz, filed June 7, 1946.

The loading mechanism includes a middle track assembly 60 consisting of a pair of parallel rails 70 tiltably mounted above the mortar tube by means of pivots 80 in brackets 78 which are secured to the recoil mechanism 22. A forward track extension 61 serves to extend the track 60 and rails 70 forwardly of the mortar tube 20 for a purpose to appear. This forward extension is pivotally mounted at the forward end of track 60 by means of hinges 71 arranged so that the extension 61 in its normal extended position constitutes a forward continuation of track 60, the extension being pivotable about hinges 71 to a retracted position in which it rests on top of track 60 in a position to be out of the way during transportation of the mortar. A spring actuated plunger 66 having handle 68 is slidably engaged in a housing 69 for locking the hinge 71 when forward track extension 61 is in the extended position.

A cross head 72 is provided at the forward end of track extension 61 to keep rails 70 in the desired parallel relationship and to serve as a support for a pulley 110 the purpose of which will be shown later.

A U-shaped yoke 170 is suitably bolted to rails 70 near the forward end of track extension 61. This yoke 170 serves as an additional stiffening means for rails 70 and as a base for mounting a bracket 171.

A rearward track extension 62 is pivotally mounted at the rear end of track 60 and is arranged to serve as a rearward continuation of track 60 and rails 70 and to pivot in a vertical plane with respect to the longitudinal axis of the mortar, moving between a supported position in which a foot 98 secured to the end of the extension rests on the ground when the track is in its normal position and a suspended position when the track is in its tilted position.

A cross head 74 is provided at the rear end of rearward extension 62 for spacing the rails 70 thereof and serves as a base for attaching foot 98. Foot 98 is provided for supporting the free end of the rearward extension on the ground.

As shown particularly well in Fig. 20, an elbow support 81 consisting of a lower arm 82 and an upper arm 83 pivotally joined as at 89 is provided for tilting the track 60 and extensions 61 and 62. The upper arm 83 is pivotally mounted to the rear end of track 60 by a pivot pin 90, and lower arm 82 is pivotally mounted to an arcuate plate 85. A spring latch 84 is provided on the lower support arm 82 for engagement with either of two notches 86 and 87 cut in the periphery of arcuate plate 85. When latch 84 is engaged in notch 87, the track is substantially parallel to the mortar tube. When latch 84 is engaged in notch 86, the track is in a tilted relation with the forward extension 61 extending obliquely in front of the tube 20.

A car 92 is provided to run between rails 70 of track 60 and extensions 61 and 62 and carry a projectile to the muzzle of the mortar tube 20. The car is provided with two pairs of rollers, one pair 94 mounted at the upper rear portion of car 92 and the other pair 96 mounted at the lower front portion of car 92. The track rails 70 are in the form of opposite channels, both pairs of rollers 94 and 96 being engaged between the two flanges of the corresponding channel, so that the car 92 is maintained in oblique relation with rails 70, the rear end lying between, and the forward end being held substantially above the rails. When the track and extensions are tilted forward with the car in position on the forward extension 61, the car is aligned with the mortar tube so that a projectile in the car is in a position to drop directly into the muzzle of the tube.

Upper and lower doors 122 and 124 respectively are slidably mounted at the rear end of car 92, the doors being normally held closed by springs 130 and 131 acting on levers 132 and 152 respectively. The springs 130 and 131 are mounted on guide rods 135 and 136 respectively. Lever 132 is pivotally mounted to the side of car 92 as shown at 134 in Figs. 2 and 12 and is engaged in a notch 144 in upper door 122. Lever 152 is fixedly mounted on one end of a shaft 150 which is in turn rotatably mounted (not shown) to the underside of car 92. One end of lever 152 engages lower door 124 in a notch 154. A cup 156 is provided on the other end of lever 152 for seating guide rod 136. Although not shown, it is to be understood that a similar arrangement is also provided on the opposite side of car 92.

The hoisting means for the car, as shown in Figs. 15-17, consists of a wire cable 100, one end of which is provided with a hook 101 by means of which it can be secured to the front axle of the car. The other end of the cable is attached to (the drum of) a winch 102 mounted adjacent the rear end of track 60. A handle 104 is provided for manual operation of the winch 102 through reduction gears 106. The cable 100 passes over pulley 110 mounted on the upper cross head 72. A ratchet and pawl (not shown) are provided for locking the winch.

Car 92 comprises a trough portion 114 designed to receive the projectile to be fired from the mortar. A retaining bar 116 is hinged by a pin 118 to one side of the car 92 and can be attached to the other side by means of a pin 120 to prevent the projectile in the car 92 from falling out. Upper door 122 is provided with a lug 126 arranged so that as the track is rocked forward to place the car 92 in front of the mortar tube, the lug will catch on the muzzle end of the mortar and push the door open against the force of the spring 130, so that when lower door 124 is opened by means to be later described, the projectile will be free to fall into the muzzle of the mortar tube.

Bracket 171 is mounted on the left side of yoke 170 on forward track extension 61. A shaft 172 is pivotally mounted through the left side of the yoke 170 and extends through bracket 171. As shown in Fig. 10, an arm 174 is fixedly secured to one end of shaft 172 and a lever 176 is fixedly secured to the other end. Lanyard 140 is attached to lever 176 and extends to the rear end of the mortar. A handle 142 attached to the free end of lanyard 140 is provided for manual operation thereof. Lever 176 and arm 174 are both constructed and arranged so that when car 92 has been hoisted to the upper end of the track and swung into alignment with the muzzle end of the mortar tube 20, a pull on lanyard 140 pivots lever 176 thereby rotating shaft 172 and causing arm 174 on the other end thereof to move upwardly against cup 156 and pivot lever 152 against the tension of spring 131. As a result, the other end of lever 152 which is engaged in notch 154 of door 124 causes the door to open and release the projectile into the muzzle of the mortar tube 20. The identical mechanism on the opposite side of car 92 is also operated by the upward movement of arm 174 since shaft 150 is rotated as lever 152 is pivoted. The projectile is a close enough fit in the tube so that its fall is checked by the air cushion built up by the air below being compressed, and hence moves slowly to the bottom as the entrapped air escapes past it.

When a projectile has been loaded into the mortar, the track is pivoted back parallel to the mortar tube by means of the elbow support 81 and locked in place by the engagement of spring latch 84 in lower notch 87 in the arcuate plate 85. The mortar is now ready for firing.

I claim:

1. A loading mechanism for muzzle loading mortars and the like comprising in combination, a track mounted on a mortar, a car adapted to travel on said track, means for moving said car with a projectile therein along said track to a loading position in alignment with the muzzle of the mortar, and means on said car operable to release the projectile for movement into the muzzle of the mortar.

2. A mechanism for loading projectiles into the tubes of large caliber muzzle loading mortars and the like comprising in combination, a track mounted on a mortar, said track being of substantially greater length than a mortar tube and extending to a position forwardly thereof, a car adapted to move on said track and to hold a projectile, means for moving said car with a projectile therein along said track to said forward position, and means for aligning the rear end of said car with the muzzle end of the mortar tube whereby the projectile is adapted to enter the mortar tube upon release from said car.

3. A mechanism for loading projectiles into the tubes of large caliber muzzle loading mortars and the like comprising in combination, a track of substantially greater length than a mortar tube and extending to a position forwardly thereof, said track being mounted on a mortar, said track being tiltable about a horizontal axis intermediate the ends of said track, a car adapted to move on said track and to hold a projectile, means for hoisting said car with a projectile therein along said track to said forward position, means for tilting said track to move said hoisted car and projectile into a loading position whereby the rear end of said car is in alignment with the muzzle end of the tube of the mortar, and means for releasing said projectile from said loading position into the muzzle end of the mortar tube.

4. A mechanism for loading projectiles into the tubes of large caliber muzzle loading mortars and the like comprising in combination, a track of substantially greater length than a mortar tube and extending to a position forwardly thereof, said track being tiltably mounted on a mortar, said track being tiltable about a horizontal axis intermediate the ends of said track, a car adapted to travel on said track and to hold a projectile, means for hoisting said car with a projectile therein along said track to said forward position, means for tilting said track to move said hoisted car and projectile into loading position in alignment with the tube of the mortar, a pair of slidable doors on said car, said doors being adapted to hold the projectile in said car, means on one of said doors adapted to engage the mortar tube whereby said one of said doors opens as said car is moved into said loading position, and manually operable means for opening the other of said doors.

5. A device for loading projectiles into mortar tubes of large caliber comprising in combination, a carriage, a mortar tube slidably mounted on said carriage, a track pivotally mounted on said carriage above said mortar tube, means for locking said track in a position substantially parallel with said mortar tube, a car movably engaged in said track and adapted to carry a projectile, means for hoisting said car to a position forward of the muzzle of said mortar tube, means for pivoting said track whereby said car is moved into alignment with the muzzle end of said mortar tube, a slidable door mounted on the rear end of said car, and means for manually opening said door to release the projectile into the muzzle of said mortar tube.

6. A device for loading projectiles into the tubes of large caliber muzzle loading mortars and the like comprising in combination, a carriage, a recoil mechanism secured thereto, a mortar tube slidably mounted on said recoil mechanism, a track tiltably mounted on said recoil mechanism, said track having a forward end and a rearward end, a forward track extension pivotally mounted on said forward end of and in alignment with said track whereby said forward track extension can be pivoted back overhead to a retracted position, a rearward track extension having one end pivotally mounted on said rearward end of said track and arranged to be pivoted vertically about said rearward end and forwardly overhead, a shoe secured to said rearward track extension, said shoe being provided to support the free end of said rearward track extension on the ground, a car adapted to travel on said track and said track extensions and to hold a projectile, a winch secured to said track and adapted for manually moving said car along said track and said track extensions to a position forward of said mortar tube, means whereby said track can be tilted to place said car and the projectile in alignment with the muzzle end of said mortar tube, a slidable door mounted at the rear end of said car, and means for manually opening said door to release the projectile into the muzzle of said mortar tube.

7. A mechanism for loading projectiles into the tubes of large caliber muzzle loading mortars and the like comprising in combination, a gun carriage, a recoil mechanism mounted on said gun carriage, a mortar tube slidably mounted on said recoil mechanism, a track pivotally mounted on said recoil mechanism above said mortar tube, said track adapted to be pivoted from a normal position substantially parallel to said mortar tube to a tilted loading position oblique with respect to said mortar tube, said track having a forward extension and a rearward extension, said forward track extension being pivotally attached to said track by a hinge, said forward extension having a forward operating position in alignment with said track and a rearward retracted position, said hinge being adapted to permit movement of said forward track extension between said retracted position and said operating position, said hinge being provided with a latch for locking said forward track extension in said operating position, said rearward track extension being pivotally attached to said track, a foot attached to said rearward track extension and adapted to rest on the ground at the rear of the mortar for supporting said rearward track extension, a folding support pivotally mounted to said track, said folding support having a folded position and an extended position, said support in said folded position maintaining said track substantially parallel to said mortar tube and in said extended position maintaining said track in said tilted position with said forward extension projecting obliquely in front of the muzzle end of said mortar tube, a car adapted to travel on said track and said track extensions and to hold a projectile, a winch secured to said track, said winch being adapted to hoist said car with the projectile therein along said track and said track extensions to a position forwardly of said mortar tube, a first slidable door mounted at the rear end of said car and adapted to be opened by contact with the muzzle end of said mortar tube when said car is moved into said tilted loading position, a second slidable door mounted at the rear end of said car below said first slidable door, and a pivotable lever on either side of said car engaging said second slidable door, said lever being operable to open said second slidable door thereby releasing the projectile into the muzzle end of said mortar tube.

MAURICE F. HEALY.

No references cited.